(12) United States Patent
Berkman et al.

(10) Patent No.: US 12,036,500 B2
(45) Date of Patent: Jul. 16, 2024

(54) FAN ASSEMBLY WITH FILTERING AND EXHAUST

(71) Applicant: Homewerks Worldwide, LLC, Lake Bluff, IL (US)

(72) Inventors: Peter D. Berkman, Highland Park, IL (US); Michael J. Malaker, Kenosha, WI (US); Deborah Holtkamp, Milwaukee, WI (US); Huang XiaoYing, Guangzhou (CN); He LiTing, Foshan (CN); Lin TiaoHao, Foshan (CN); Zhang Ruilin, Foshan (CN)

(73) Assignee: HOMEWERKS WORLDWIDE, LLC, Lake Bluff, IL (US)

( * ) Notice: Subject to any disclaimer, the term of this patent is extended or adjusted under 35 U.S.C. 154(b) by 478 days.

(21) Appl. No.: 17/404,682

(22) Filed: Aug. 17, 2021

(65) Prior Publication Data
US 2023/0055622 A1  Feb. 23, 2023

(51) Int. Cl.
| | |
|---|---|
| B01D 46/00 | (2022.01) |
| B01D 46/10 | (2006.01) |
| B01D 46/42 | (2006.01) |
| B01D 46/44 | (2006.01) |
| F24F 7/00 | (2021.01) |
| F24F 7/04 | (2006.01) |

(Continued)

(52) U.S. Cl.
CPC ..... B01D 46/0049 (2013.01); B01D 46/0006 (2013.01); B01D 46/10 (2013.01); B01D 46/4272 (2013.01); B01D 46/44 (2013.01); F24F 7/04 (2013.01); *B01D 2273/30* (2013.01); *B01D 2279/35* (2013.01); *F24F 2007/001* (2013.01)

(58) Field of Classification Search
CPC ....... F24F 2013/205; F24F 13/28; F01N 3/22; F01N 9/00
USPC .......................... 55/385.3, 471–473, DIG. 34
See application file for complete search history.

(56) References Cited

U.S. PATENT DOCUMENTS

| | | | |
|---|---|---|---|
| 4,867,640 A * | 9/1989 | Penlesky | F04D 29/626 415/214.1 |
| 6,257,317 B1 | 7/2001 | DeGregoria et al. | |

(Continued)

FOREIGN PATENT DOCUMENTS

| | | | | |
|---|---|---|---|---|
| CN | 107101283 | 8/2017 | | |
| CN | 109595811 A * | 4/2019 | | F24F 3/14 |

(Continued)

OTHER PUBLICATIONS

Search Report and Written Opinion dated Jan. 6, 2023 issued in International Patent Application No. PCT/US2022/040624.

*Primary Examiner* — Minh Chau T Pham
(74) *Attorney, Agent, or Firm* — Cozen O'Connor

(57) ABSTRACT

An exhaust and filtration assembly includes: a housing; an exhaust vent configured to guide unfiltered air out of the exhaust and filtration assembly; a filter assembly configured to filter air and guide the filtered air out of the exhaust and filtration assembly; an exhaust assembly configured to direct raw air from an entry port of the exhaust and filtration assembly and direct air out of the exhaust vent without the air having been filtered; and a controller comprising computing logic configured to control so that only one of air filtration and raw air exhaust occurs at any given time.

16 Claims, 17 Drawing Sheets

(51) Int. Cl.
    *F24F 11/65*    (2018.01)
    *F24F 13/28*    (2006.01)

(56)         References Cited

U.S. PATENT DOCUMENTS 6,779,735 B1 *    8/2004   Onstott ................. F24F 12/006
                                                        165/267
 2002/0189215 A1 *   12/2002   Goyetche ............... B01D 46/62
                                                         55/473
 2019/0117030 A1      4/2019   Kette

FOREIGN PATENT DOCUMENTS

CN           214791651 U      11/2021
 JP          2007032881 A  *    2/2007    .............. F24F 7/007
 KR         20200077456 A  *    6/2020    .............. F24F 7/007
 WO       WO 2021096862 A1 *    5/2021    .............. F24F 11/56

* cited by examiner

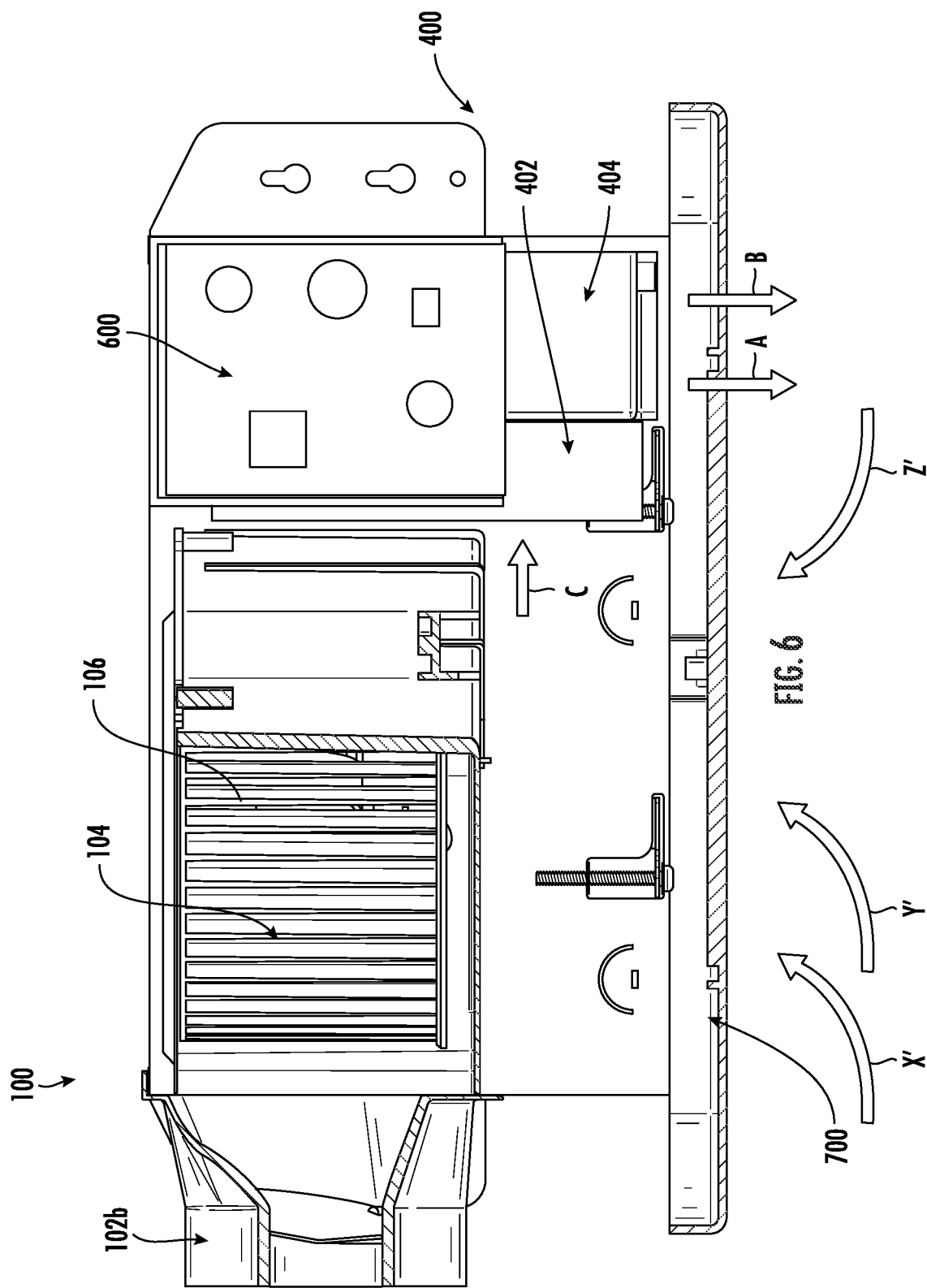

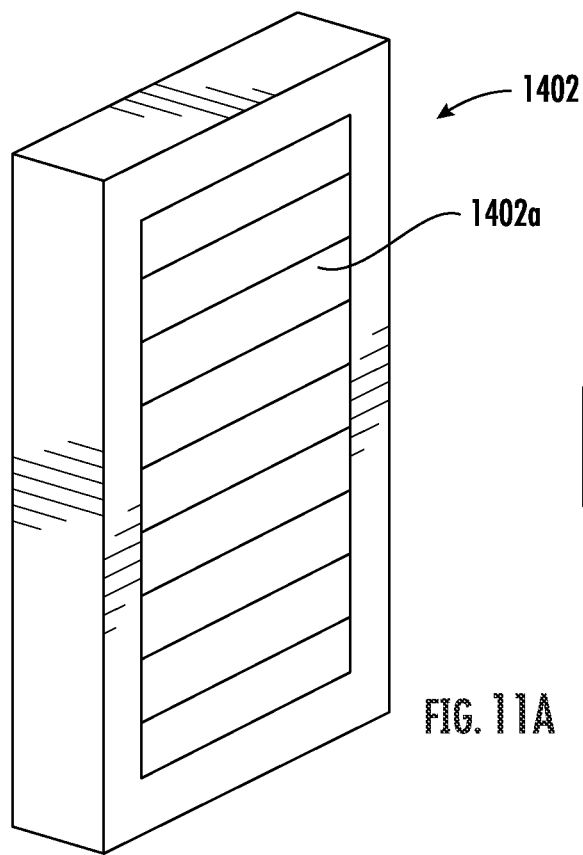
FIG. 11A
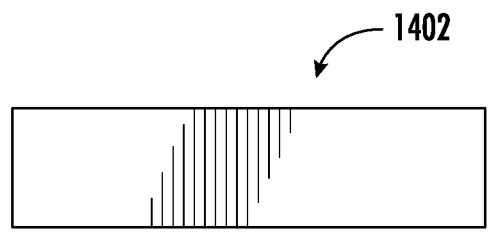
FIG. 11B
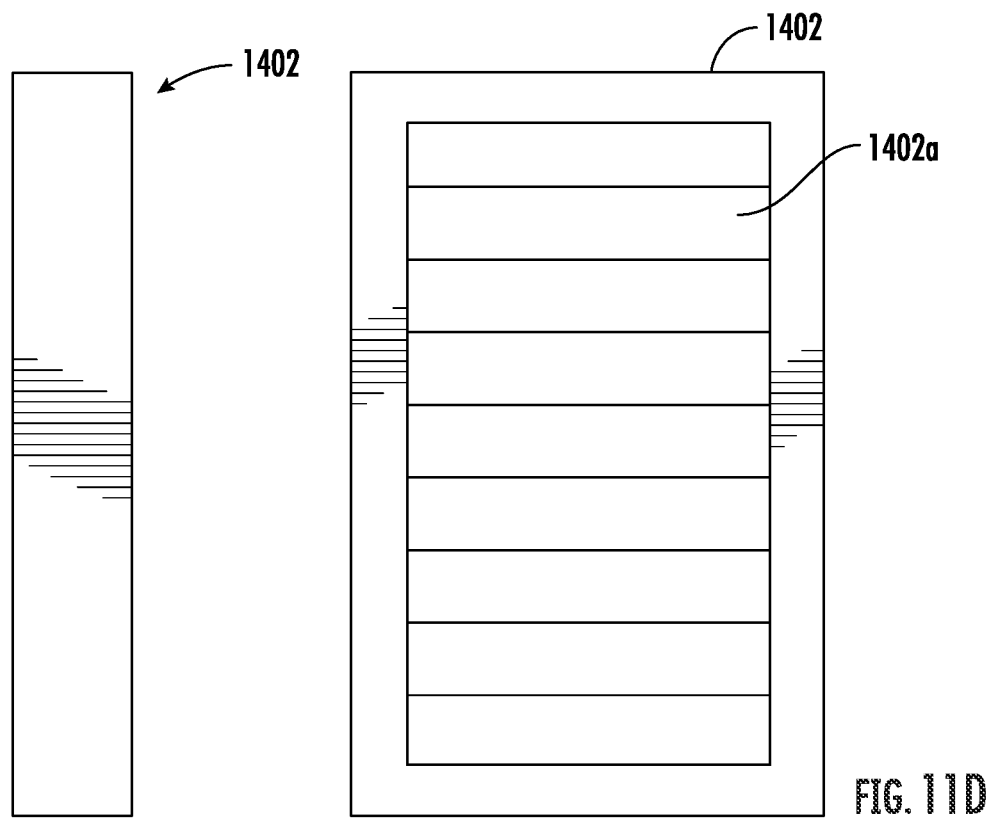
FIG. 11C
FIG. 11D

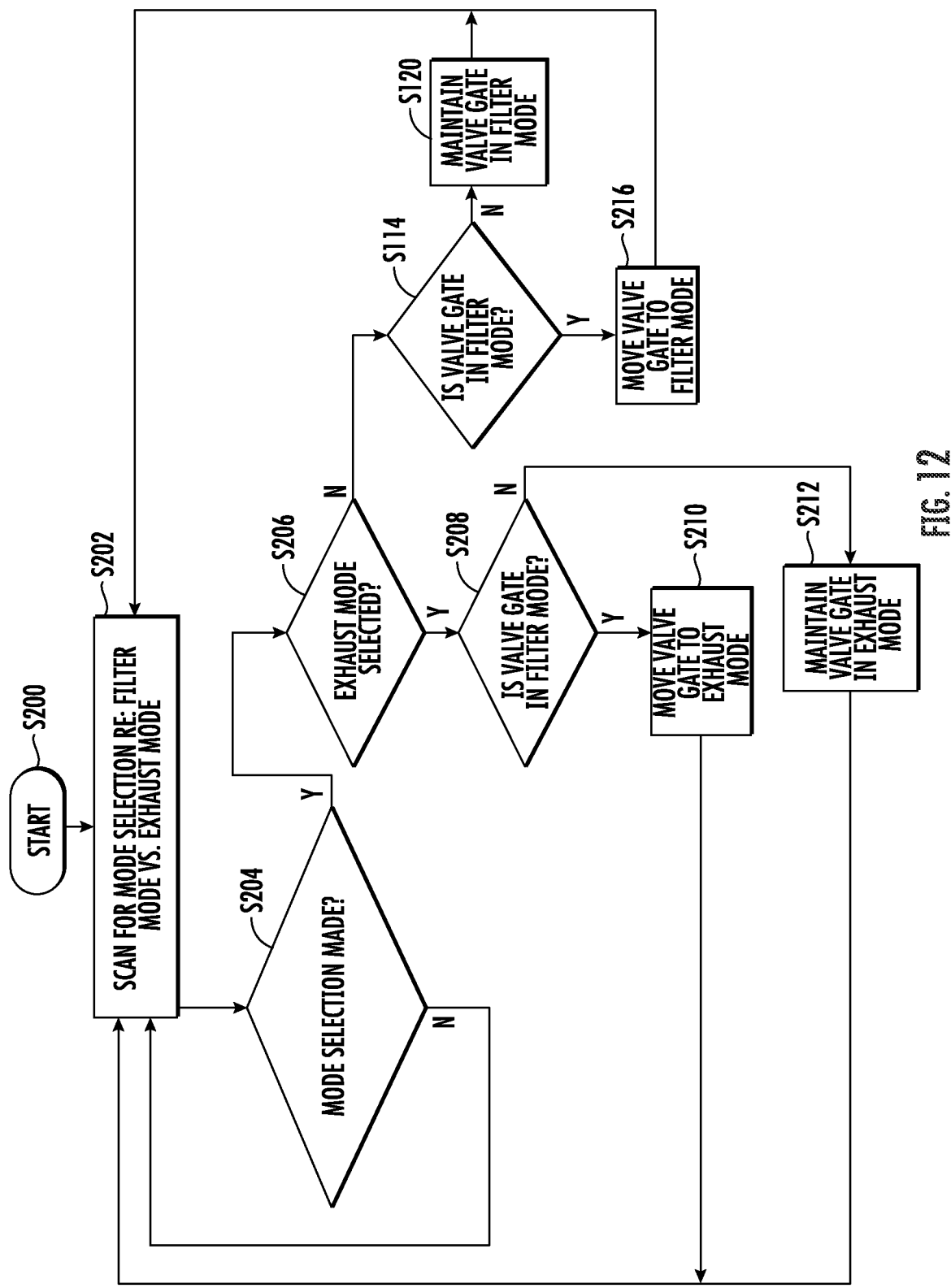

FAN ASSEMBLY WITH FILTERING AND EXHAUST

BACKGROUND OF THE INVENTION

1. Field of the Invention

The invention relates generally to exhaust fans and filtration fans for use in in bathrooms or other areas requiring air circulation.

2. Related Art

Exhaust fans that expel air, for example to freshen a bathroom, are known. Also known are air filtration techniques, which instead of evacuating air, provide recirculation of air but with the air having been filtered before returning back to the room. One of the challenges in combining exhaust fans with air filtration is that the humidity expelled by the exhaust fan in a typical exhaust scenario would be deleterious to a filter, for example by causing mold to form on a filter element. Thus, there is a need for a fan assembly that permits filtration and exhaust to be provided in a common housing without harming the filter system.

SUMMARY OF THE INVENTION

In accordance with a first aspect of the present invention, an exhaust and filtration assembly includes: a housing; an exhaust vent configured to guide air out of the exhaust and filtration assembly; a filter assembly arranged in the housing and configured to filter air and guide the filtered air out of the exhaust and filtration assembly; an exhaust motor assembly, having an exhaust motor, the exhaust motor assembly being at least partially arranged in the housing and configured to, when powered on, draw air from an entry port of the exhaust and filtration assembly and direct air out of the exhaust vent; a filter motor assembly, having a filter motor, the filter motor assembly being at least partially arranged in the housing and configured to, when powered on, draw air from the entry port of the exhaust and filtration assembly, and direct the air into the filter assembly for filtration; and a controller comprising computing logic configured to control the powering on and off of the exhaust motor assembly and the filter motor assembly so that only one of the exhaust motor assembly and the filter motor assembly is powered on at any given time.

In another aspect, the exhaust and filtration assembly further including a touch sensitive control panel, the control panel being configured to receive tactile input from a user, the input including a selection at least from among an exhaust fan selector and a filter fan selector.

In another aspect, the controller is configured to permit separate running of the assembly in only one of two modes: an exhaust fan only mode, and a filter fan only mode, such that the exhaust fan only mode and the filter fan only mode are mutually exclusive.

In another aspect, the housing has openings at its bottom to define a fan air inlet, the housing also including a circular exhaust outlet duct member sized and dimensioned to be connectible with housing ductwork.

In another aspect, the housing is made of metal and has, except for the circular outlet duct member, a rectangular shape.

In another aspect, the metal includes steel.

In another aspect, the filter assembly includes a filter including a filter element made of a filtering material suitable for HEPA filtering.

In another aspect, the filter is arranged in the housing adjacent to the filter motor so that the filter can filter air that is moved through the filter by the filter motor.

In another aspect, the exhaust motor is disposed at least partially within the housing and is positioned in a substantially vertical orientation and has motor output shaft extending vertically housing inlet and aligned along an axis of an inlet opening of the housing.

In accordance with another aspect of the present invention, an exhaust and filtration assembly includes: a housing; an exhaust vent configured to guide air out of the exhaust and filtration assembly; a filter assembly arranged in or adjacent to the housing and configured to filter air and guide the filtered air out of the exhaust and filtration assembly; a valve gate assembly arranged in the housing, the valve gate assembly having a valve gate configured to move selectively between a first position in an exhaust mode in which air can only be directed towards the exhaust vent, and a second position in a filter mode in which air can only be directed towards the filter assembly; a motor and fan assembly at least partially arranged in the housing and configured to, when powered on, draw air from an entry port of the exhaust and filtration assembly and to drive air toward the valve gate assembly; and a controller comprising computing logic configured to control the position of the valve gate between the first position in the exhaust mode and the second position in the filter mode, wherein the control of the valve gate position is on the basis of a mode selection of a user.

In another aspect, the exhaust and filtration assembly further includes a touch sensitive control panel, the control panel being configured to receive tactile input from a user, the input including a selection at least from among the exhaust mode and the filter mode.

In another aspect, the controller is configured to permit separate running of the assembly in only one of the exhaust mode and the filter mode, by controlling of the position of the valve gate between the first position in the exhaust mode and the second position in the filter mode based on the selection made by the user on the touch sensitive control panel.

In another aspect, in the first position in the exhaust mode, the valve gate is positioned at zero degrees with respect to the direction of air output from the motor, such that air can exit the a exhaust and filtration assembly via the exhaust outlet, and in the second position in the filter mode, the valve gate is positioned at 90 degrees with respect to the direction of air output from the motor, such that air is completely blocked from exiting the assembly via the exhaust outlet, and instead is diverted toward the filter.

In another aspect, the filter assembly includes a filter including a filter element made of a filtering material suitable for HEPA filtering.

In another aspect, the filter is arranged in a slot in a grating arranged adjacent the housing so that the filter can filter air that is moved through the filter by the motor when the valve gate is in the second position in the filter mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The figures are described as follows:

FIG. 6 illustrates the combined exhaust and filtration assembly running in a second mode in accordance with the first embodiment;

FIGS. 11A, 11B, 11C and 11D are perspective, top, side and elevation views, respectively, of the filter in accordance with the second embodiment;

FIG. 12 is a flow chart illustrating an exemplary algorithm for controlling the combined exhaust and filtration assembly in accordance with the first and second modes of second embodiment;

DETAILED DESCRIPTION OF THE DISCLOSED EMBODIMENTS

Figure 1:
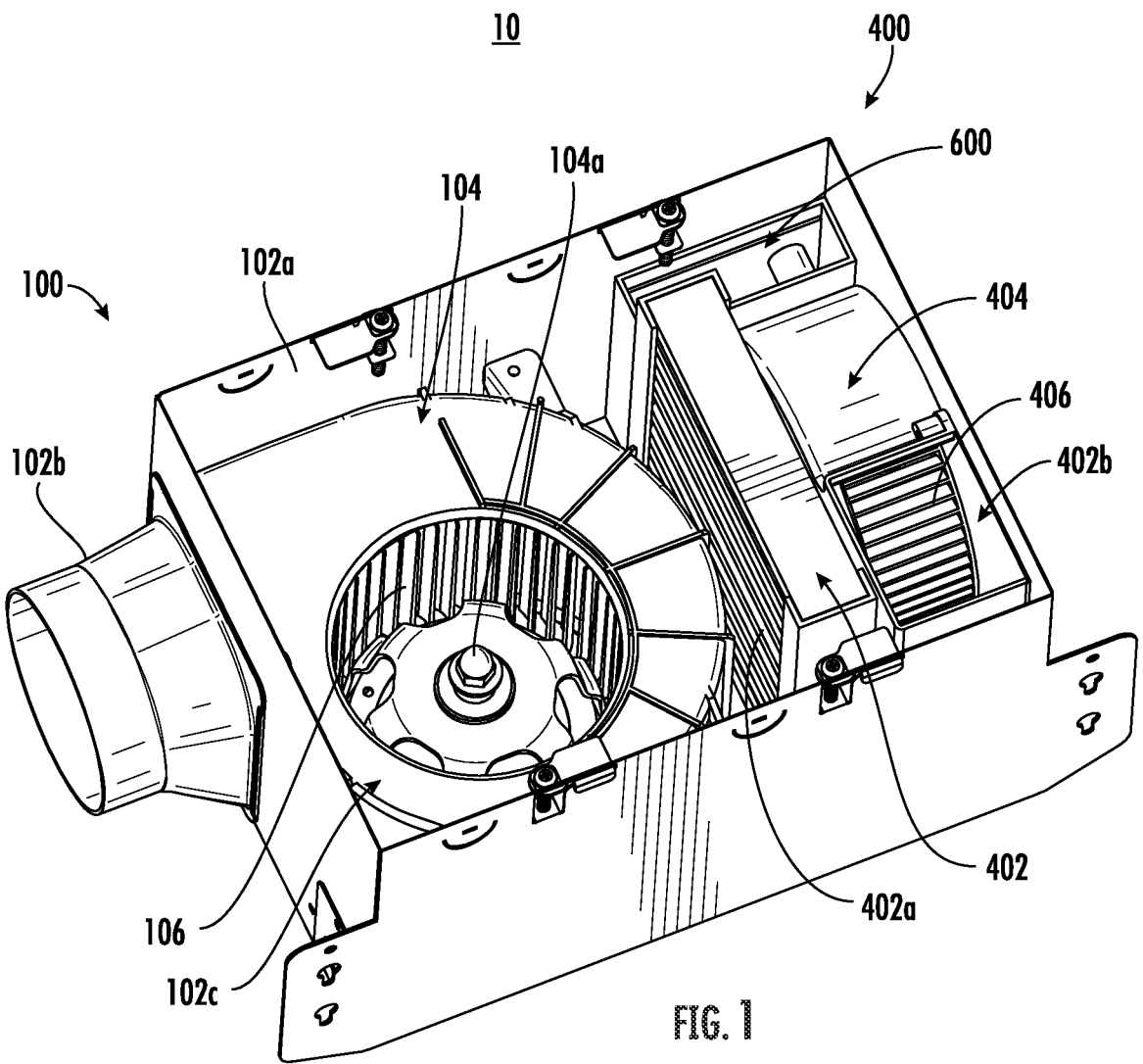
FIG. 1 is an underside view of a first embodiment of a combined exhaust and filtration assembly.

Corresponding reference characters indicate corresponding components throughout the several views of the drawings. Elements in the figures are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of the illustrated elements.

The following description is not to be taken in a limiting sense, but is made merely for the purpose of describing exemplary embodiments. Reference throughout this specification to "one embodiment", "an embodiment", "some embodiments", "one form", or similar language means that a particular feature, structure, or characteristic described in connection with the embodiment is included in at least one embodiment of the present invention. Thus, appearances of the phrases "in one embodiment," "in an embodiment," "some embodiments", "in one form", "in another form", and similar language throughout this specification may refer to the same embodiment and/or may refer to separate or alternate embodiments as well. Furthermore, the described features, structures, or characteristics of the invention may be combined in any suitable manner in one or more embodiments.

FIG. 1 is an underside view of a first embodiment of a combined exhaust and filtration assembly 10 which includes an exhaust assembly 100 and a filtration assembly 400. To allow an unobstructed underside view of the interior of the assembly 10, this particular view does not show the inlet panel, or "grill," which will be discussed below in relation to figures in which it is visible.

The assembly 10 includes a housing 102 having openings at its bottom to define an exhaust fan air inlet 102a and a filtration fan air inlet 402, as well as a circular exhaust outlet duct member 102b sized to connect, e.g., with conventional ductwork. The housing 102 may, for example, be made of metal, such as steel, and preferably has a generally rectangular body with a circular outlet duct member 102b.

The combined exhaust and filtration assembly 10 includes, in a first embodiment, an exhaust fan assembly 100 having an exhaust motor 104 and a filtration assembly 400 having its own filter motor 404. The combined exhaust and filtration assembly 10 also includes a PCB board 600 that has logic, such as a microprocessor and associated data storage, such as volatile memory (e.g., RAM) and non-volatile memory, such as EEPROM, e.g., for storing a program/algorithm to be run by the controller/logic to, for example, control the two motors 104 and 404. The PCB 600 will be discussed in more detail below.

The exhaust motor 104 is disposed at least partially within the housing 102 and is positioned in a substantially vertical orientation with the motor output shaft 104a extending vertically down as shown in FIG. 1 toward the housing inlet 102a and aligned along an axis of the inlet opening 102a.

A centrifugal impeller (also referred to a "fan") 106 is connected directly to the output shaft 104a of the exhaust motor 104 and is rotated by the exhaust motor output shaft 104a to pull air into the inlet 102a, through the housing interior 102c and out of the exhaust fan assembly 100 via the exhaust fan air outlet 102b. The centrifugal fan 106 will preferably move a constant volume of air (constant CFM) through the fan housing at a constant fan speed and allow for quiet operation (e.g., 2.0 Sones or less). In other embodiments different types of fans, such as axial-flow fans, scroll fans, or cross-flow fans may be used. Impellers and other components could be positioned or located outside of the housing 102.

The filter fan assembly 400 includes a filter motor 404. A centrifugal impeller 406 is connected directly to an output shaft 404a (visible in other figures discussed below) of the filter motor 404 and is rotated by the output shaft 404a to move air into the inlet 403a, located in the housing interior 102c and out of the filter fan outlet 403b.

The filter motor 404 is disposed at least partially within the housing 102 and is positioned in an orientation with the filter motor output shaft 404a extending laterally with respect to the housing 102 and preferably having a rotational axis orthogonal with respect to the rotational axis of the exhaust motor output shaft 104a. The filter 402 includes a filter element 402a, which would typically be made of a fan-folded bellows filtering material, or of other appropriate profile, such as those materials suitable a HEPA filter, which is the preferred type of filter used in the present invention. The filter 402 is arranged in the housing adjacent to the filter motor 404 so that the filter 402 can filter air that is moved through the filter by the filter motor 404.

Figure 2:
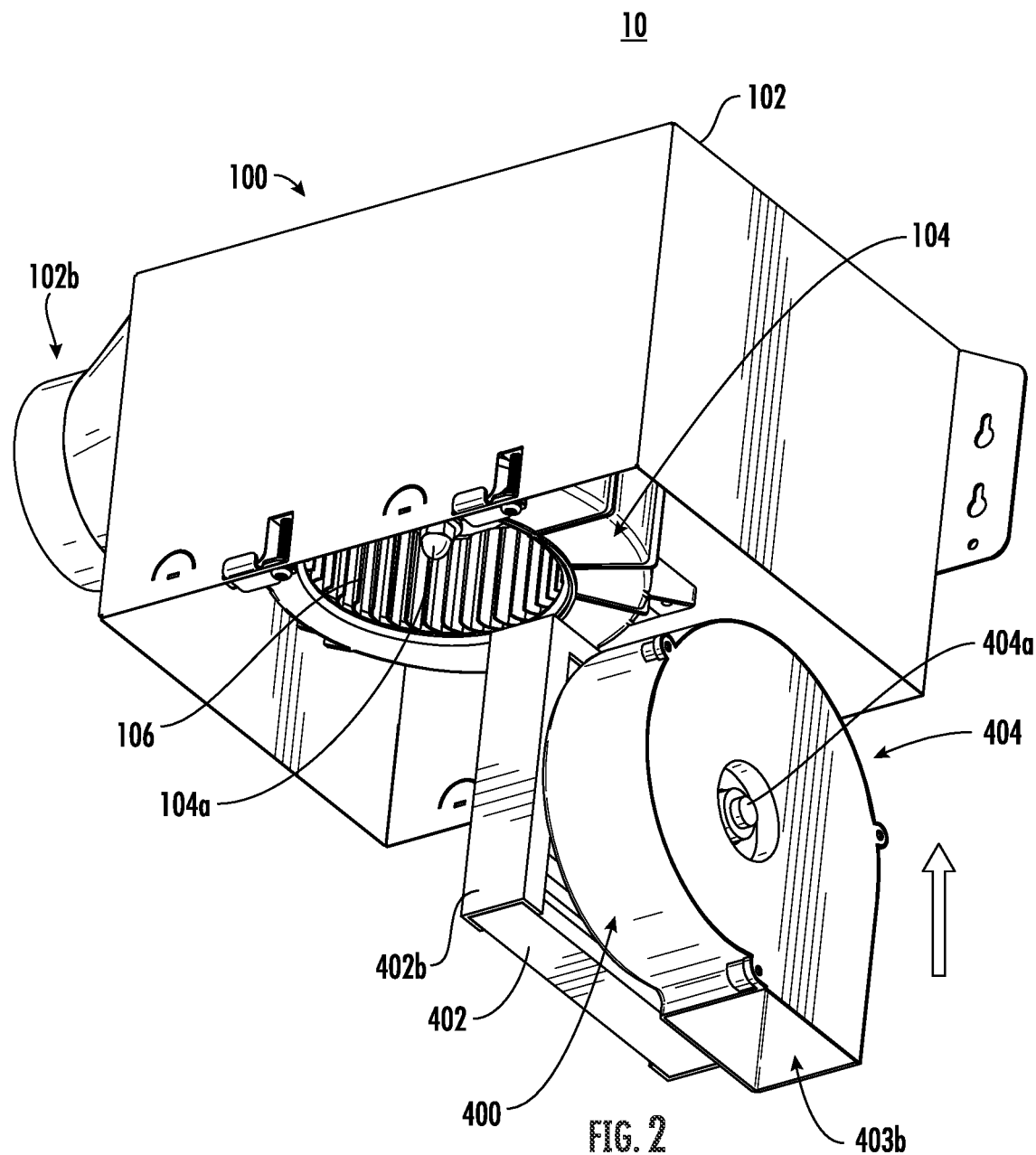
FIG. 2 is a partially exploded view of the combined exhaust and filtration assembly showing the filter fan assembly in accordance with the first embodiment.

FIG. 2 is a partially exploded view of the combined exhaust and filtration assembly 10 showing the filter fan assembly 400, with the shaft 404a visible, as well as the filter 402 and filter element 402a. Also shown clearly in this figure is the filter receiver 402b into which the filter 402 is slid in assembling the filter fan assembly 400. The dark arrow shows the direction of inserting the filter 402 into the filter receiver 402b during initial assembly to insert a replacement filter 402. Removal of a filter 402 for cleaning or replacement after it has become full of trapped particles, would occur in a direction opposite the arrow.

Figures 3A, 3B:
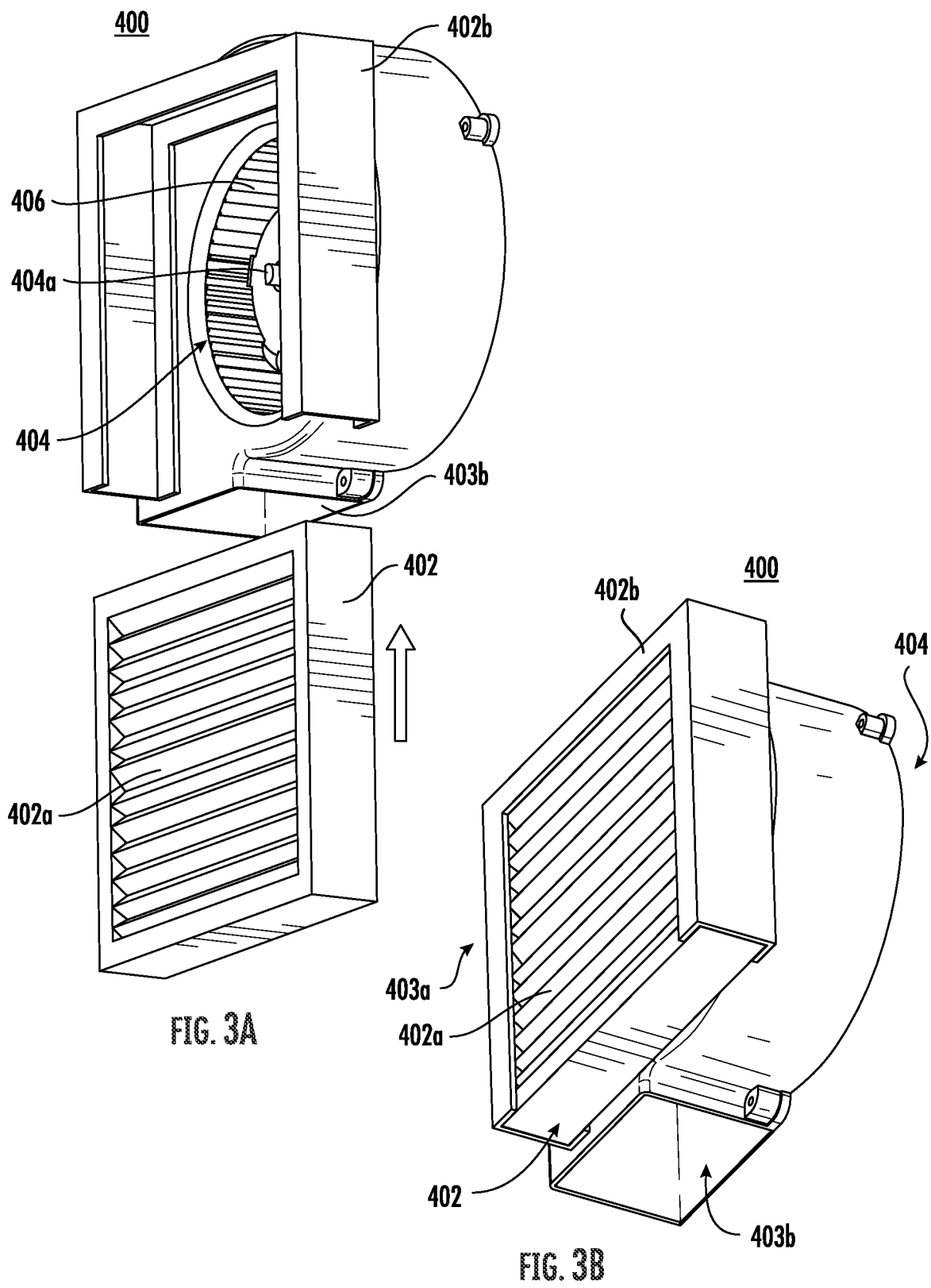
FIGS. 3A and 3B are exploded and assembled views, respectively, of the filtration assembly in accordance with the first embodiment.

FIGS. 3A and 3B are exploded and assembled views, respectively, of the filter fan assembly 400.

FIG. 3A shows the filter 402 before it is installed by being slid into the filter receiver 402b, the sliding is performed in the direction of the arrow during assembly, and in the opposite direction in a case of removing the filter 402, for example for cleaning or replacement.

FIG. 3B shows the filter fan assembly 400 after the filter has been moved into position in the filter receiver 402b.

Figure 4B:
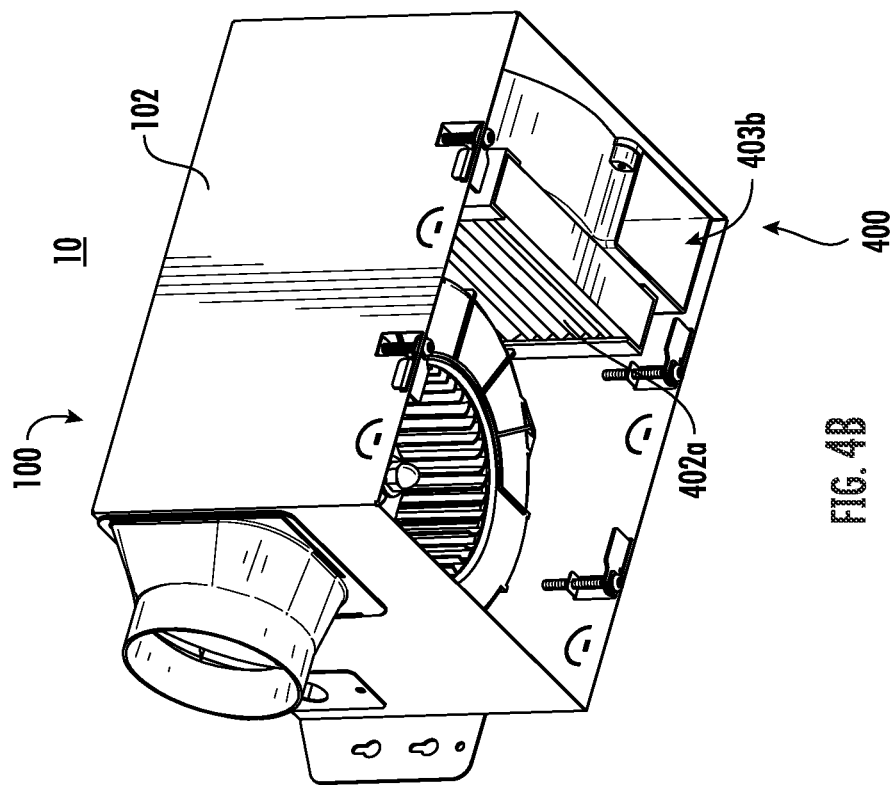
FIGS. 4A and 4B are partially exploded and assembled views, respectively, of the combined exhaust and filtration assembly in accordance with the first embodiment.
Figure 4A:
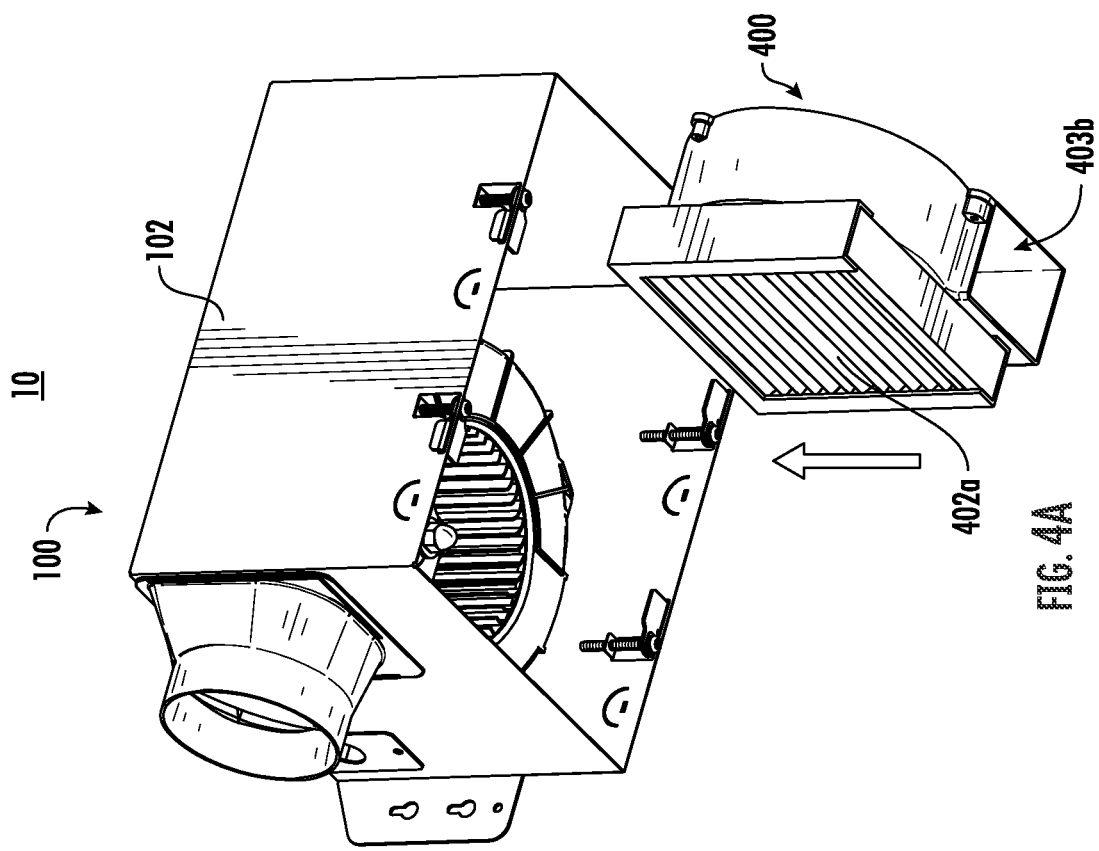

FIGS. 4A and 4B are partially exploded and assembled views, respectively, of the combined exhaust and filtration assembly 10, with the grill not being shown.

In FIG. 4A, the exhaust assembly 100 is shown already installed in the housing 102 and the filtration assembly 400 is shown not yet having been installed in the housing 102. After sliding the filter fan assembly 400, in the direction of the arrow, into the housing 102, the assembled combined exhaust and filtration assembly 10 (except for the grill) is shown in FIG. 4B.

It is possible to operate both the exhaust motor 104 and the filter motor 404 at the same time. However, it is disadvantageous to do so. One reason is that the exhaust function is often used during a high humidity condition such as showering, for example to minimize fogging up of mirrors, or condensation on walls or other surfaces. In such a case the air entering the combined exhaust and filtration assembly 10 would have a high moisture content.

Such moisture will not harm the components of the exhaust assembly 100, which are made of metal, preferably rust resistant metals, and plastic and other similar materials. But if the moist air is also drawn through the filter, the moisture would have a negative impact on the filter. Such a situation is a recipe for the formation of mold in the filter, which can produce an unhealthy situation in a room whose filtration system, designed to promote health, actually would be detrimental to occupants of a room containing the filtered air.

To prevent this, the combined exhaust and filtration assembly 10 according to this embodiment of the invention is configured to only permit separate running of the assembly in only one of two modes: the exhaust fan only mode ("the first mode"), and the filter fan only mode ("the second mode"). By virtue of the logic provided as part of a program or firmware running on logic, e.g., a program controlled microprocessor, on the PCB 600, the first and second modes are made to be mutually exclusive.

Figure 5:
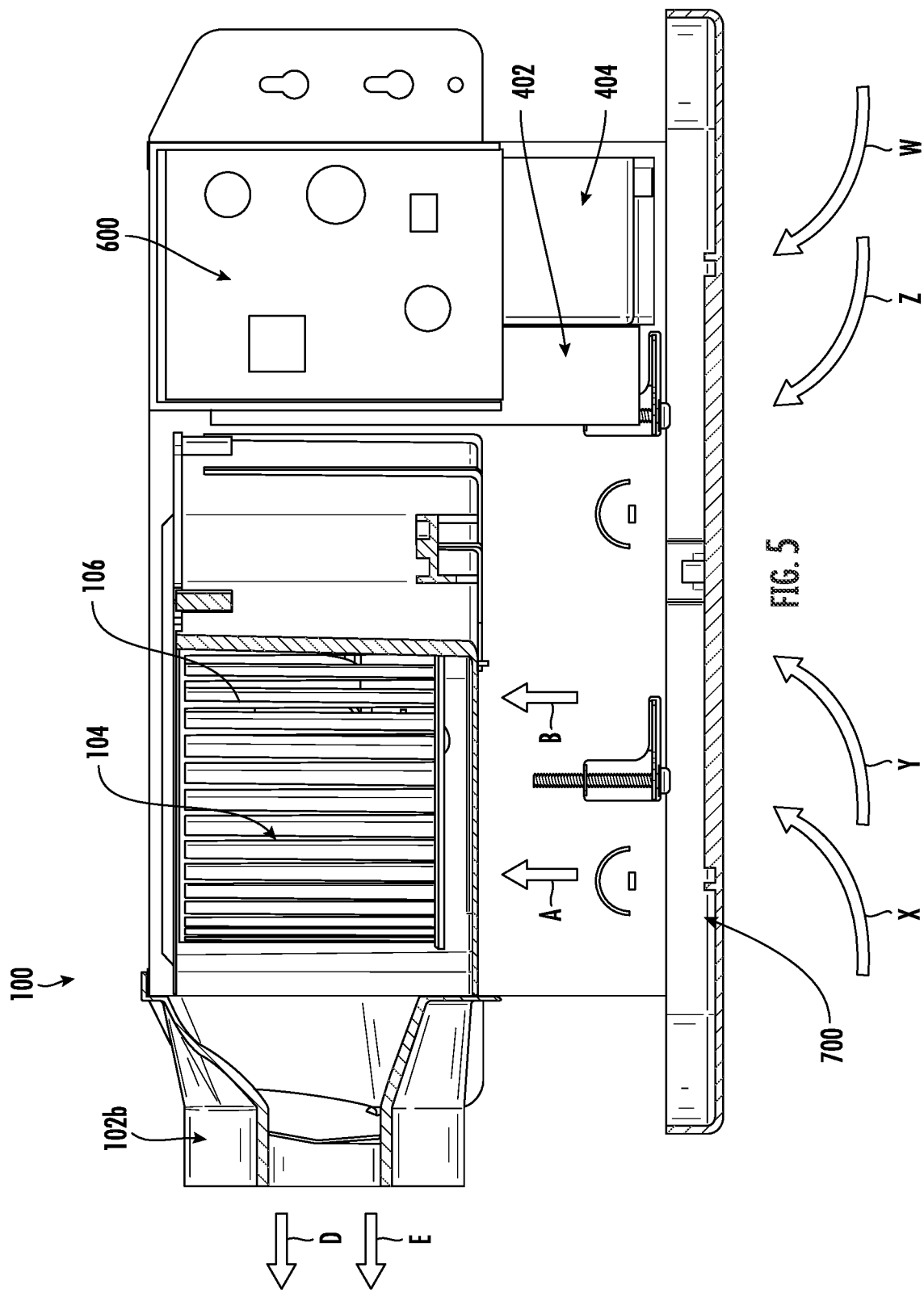
FIG. 5 illustrates the combined exhaust and filtration assembly running in a first mode in accordance with the first embodiment.

FIG. 5 illustrates the combined exhaust and filtration assembly 10 running in the first mode, while FIG. 6 illustrates the combined exhaust and filtration assembly 10 running in the second mode. Each of these figures shows the grill 700, through holes or channels in which the outside air enters the combined exhaust and filtration assembly 10.

As illustrated in FIG. 5, in the first mode only the exhaust motor 104 is running. This results in the input air, represented by arrows W, X, Y, Z entering the housing 102 through the grill 700. Because in the first mode only the exhaust motor 104 is running, all of the input air, indicated within the housing 102 as arrows A and B, is drawn by that motor 104 and, via the suction provided by the impeller 106 driven by the exhaust motor 104, is then expelled from assembly 10, via the exhaust fan air outlet 102b into, e.g., surrounding ductwork, to expel the malodorous, or simply moist, air out of the room in which the combined exhaust and filtration assembly 10 has been installed. In the first mode, since the filter fan motor 404 is not operating, none of the air from W, X, Y, Z is diverted into the filter 402, thus not exposing the filter material 402a to moisture, and preventing the formation of mold in the filter material.

As illustrated in FIG. 6, in the second mode only the filter motor 404 is running. This results in the input air, represented by arrows X', Y', and Z', entering the housing 102 through the grill 700. Because in the second mode only the filter motor 404 is running, all of the input air, indicated within the housing 102 as arrow C, is drawn by that motor 404 into the filter material 402a of the filter 402 and, via the suction provided by the impeller 406 driven by the filter motor 404, filtered air, i.e., the air C that entered, and was filtered by, the filter material 402a in filter 402, is then expelled from assembly 10, via the filter fan outlet 403b back through the grill 700, as illustrated in FIG. 6 by the arrows A and B, into the room in which the assembly 10 is servicing. In the second mode, since the exhaust fan motor 104 is not operating, all of the air represented by arrows X', Y', and Z' is diverted into the filter 402, thus providing filtered air to the corresponding room.

Figure 7A:
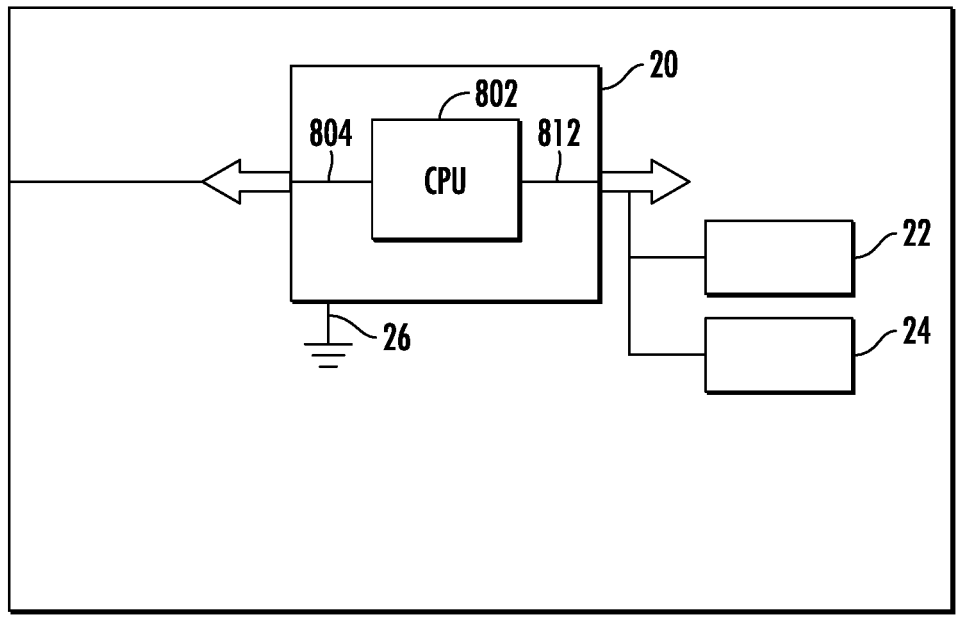
FIG. 7A is a highly schematic block diagram of control logic of the PCB in accordance with the first embodiment.
Figure 7B:
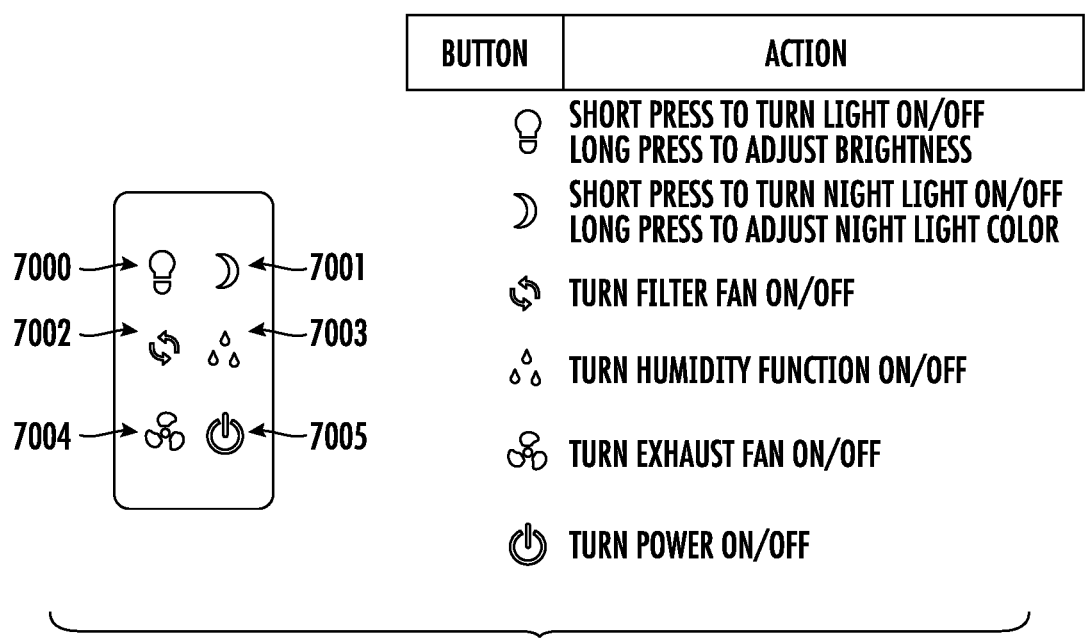
FIG. 7B shows an exemplary user interface touch pad for the first embodiment.

FIG. 7A is a highly schematic block diagram of control logic of the PCB. FIG. 7B is an example user interface touch pad for user selection of, for example, power to the system generally, duration of the selected function, i.e., exhaust vs. filter, and lighting functions.

FIG. 7B shows an image of an exemplary touch pad layout for use in the present embodiment together with a key showing the actions by each illustrated button. The light bulb button 7000 is, for example, for adjusting and turning on a light that may optionally be provided on the assembly 10. In the illustrated embodiment, the logic on the PCB is programmed to use a short press of the button to turn ON/OFF the light. A long press likewise will adjust the brightness. The crescent shaped button 7001 will turn on an optional night light with a short press and adjust the night light color with a long press. The curved circling arrows button 7002 provides an ON/OFF function for the filter fan. The water droplet button 7003 turns on and off an optional humidity/dehumidity function. The fan blades button 7004 provides an ON/OFF function for the exhaust fan. The power ON/OFF symbol butter 7005 turns the power on and off for the assembly 10.

Figure 7C:
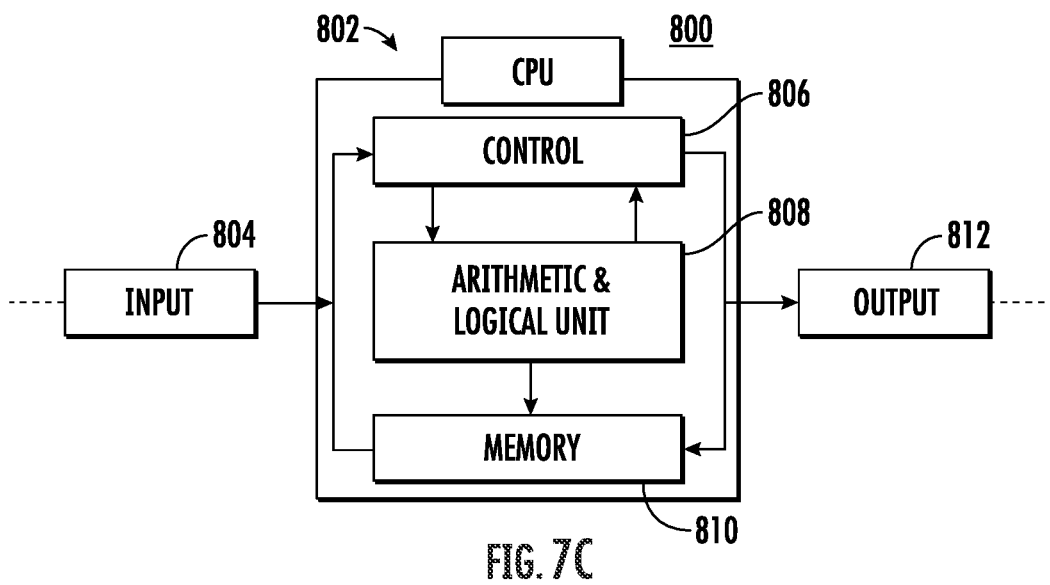
FIG. 7C is a schematic diagram of a computer usable in the control logic of the PCB in accordance with the first embodiment.

FIG. 7C is a schematic diagram of a computer usable in the control logic of the PCB. As can be seen in FIG. 7A and FIG. 7C, a controller 20, for example, comprises a computer 800 having programmable CPU 802 or similar programmable logic circuit, an input 804, and an output 812. The CPU 802 includes well known components such as the control (usually referred to as a "control unit") 806 that directs the operation of the processor, the Arithmetic Logic Unit (ALU) 808 that performs, e.g., integer calculations, and an internal memory 810. The PCB also includes RAM 22 is high speed memory for cache functions and other temporary storage. EEPROM 24 is read mostly memory to store the programs for controlling based on rules pre-programmed into it, as well as in response to user inputs on the face of the touch screen, or from a remote control, e.g., via near field radio (such as BLUETOOTH signaling). In one example, the PCB includes a transceiver 26 for receipt of signals from the remote control.

Figure 7D:
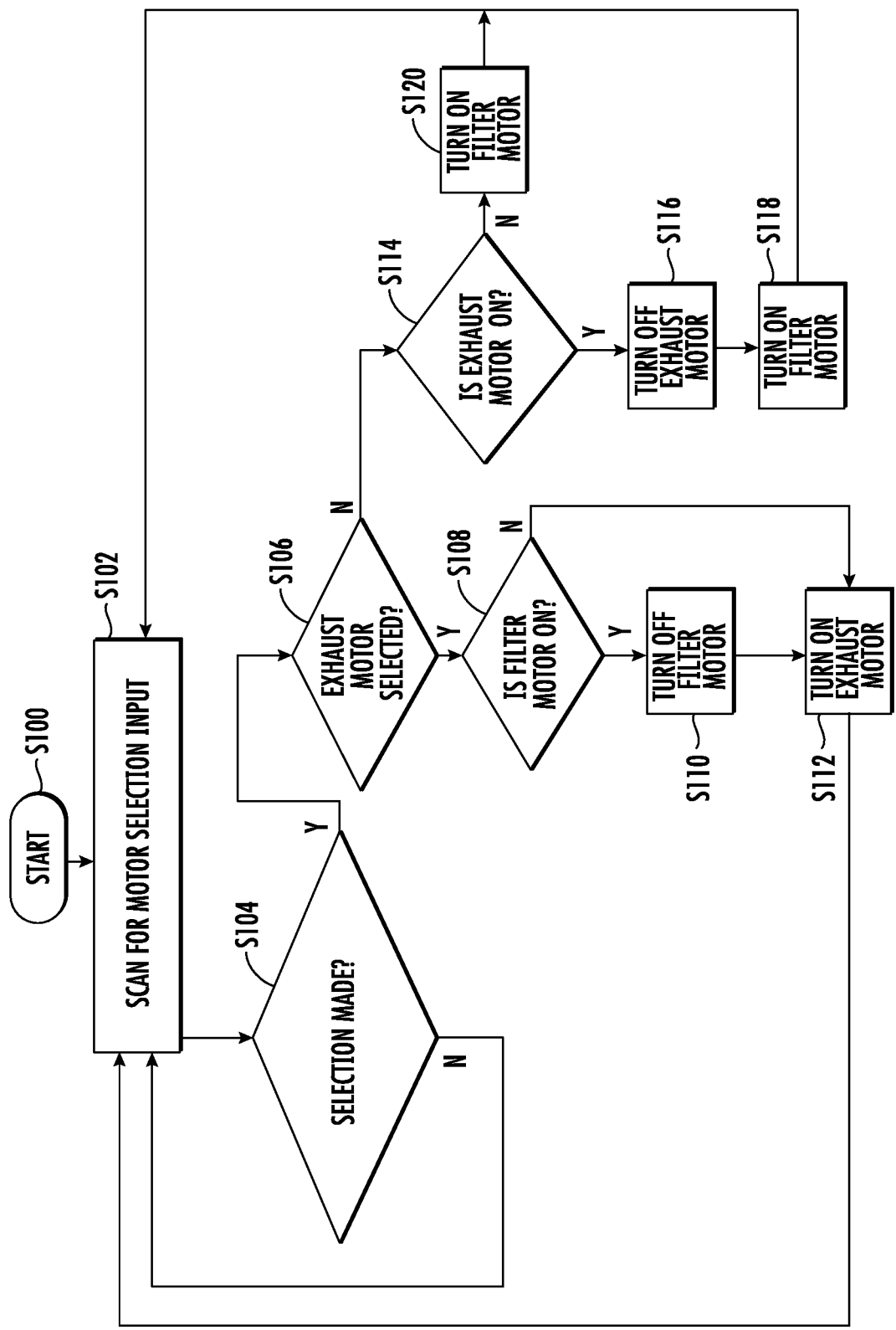
FIG. 7D is a flow chart illustrating an exemplary algorithm for controlling the combined exhaust and filtration assembly in accordance with the first and second modes of the first embodiment.

In the first embodiment, the computer 800, in conjunction with the memory components on the PCB, is configured to execute instructions stored in a non-volatile computer-readable medium, such as one or more of the memories, the algorithm for control embodied in the instructions is as set forth in the flow chart of FIG. 7D. That is, FIG. 7D is a flow chart illustrating an exemplary algorithm for controlling the assembly 10 in accordance with the two modes of the first embodiment.

In FIG. 7D, the flow begins with the start function, at step S100, which executes upon power up or a reset of the device. The flow proceeds to step S102 in which the controller scans for receipt of a motor selection signal from the remote or the keypad. At step S104 it is determined whether a selection has been made. If no at step S104, then the flow returns to step S102 to continue to monitor for input of a motor selection. If yes at step S104, then the flow proceeds to step S106 at which it is determined whether the exhaust motor has been selected. If yes at step S106, then at step S108 it is determined whether the filter motor is currently running. If yes at step S108, then at step S110 the filter motor is turned off and then, at step S112, the exhaust motor is turned on and flow goes back to the scanning step S102.

If on the other hand, it is determined at step S106 that the exhaust motor is not the motor selected, then, since this means that it was the filter motor that was selected, it is determined at step S114 if the exhaust motor is currently on. If yes at step S114, then the exhaust motor is turned off at step S116 and the filter motor is turned on at step S118, and the flow goes back to the scanning step S102.

If no at step S114, then the filter motor is turned on at step S120, and the flow goes back to the scanning step S102.

By virtue of such an algorithm, no more than one motor will run at any given time. It is noted that in the exemplary flow chart, at step S106 it is arbitrarily assigned that it is first determined whether the exhaust motor is the one selected, and then, if no, the flow proceeds on the presumption the filter motor was selected. This flow achieves the goal of the invention of making sure that only one motor runs at any given time. However, the skilled artisan would recognize that step S106 could just as easily determine whether the filter fan is the one selected. In such a variant, the steps S114, S116, S118 and S120 would follow from a "yes" answer at step S106, and steps S108, S110 and S112 would follow from a "no" answer at step S106. Since there are only two possibilities, i.e., either the exhaust motor is selected, or the filter motor is selected, either version of the algorithm will work equally well.

Preferably, the exhaust motor 104 and the filter motor 404 share a common power source. In this form, the power source is an AC power supply such as a 110-240V, 50-60 Hz power supply. In a preferred form, the back lighting of the touch screen may, for example, be wired so that it remains constantly powered or constantly on so that the touchscreen can be used to receive user input for the mutually exclusive control of the two fans regardless of whether either fan is being operated or activated.

Figure 8A:
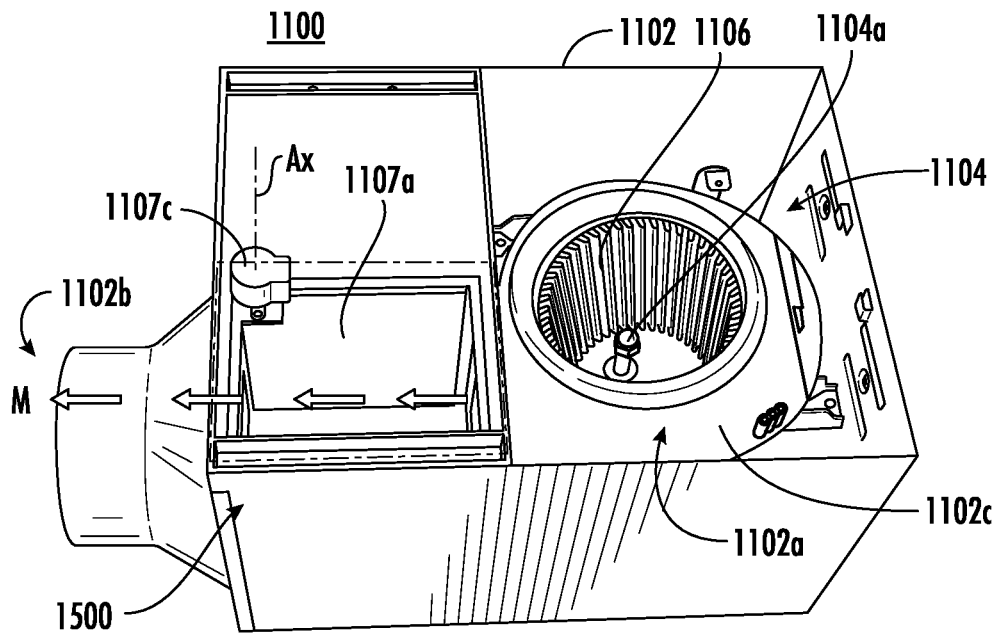
FIGS. 8A, 8B and 8C are underside views of a second embodiment of a combined exhaust and filtration assembly, with FIG. 8A illustrating a first mode of the second embodiment and FIG. 8B illustrating a second mode of the second embodiment, FIG. 8C showing how the filter is arranged with respect to the elements shown in FIGS. 8A and 8B.
Figure 8B:
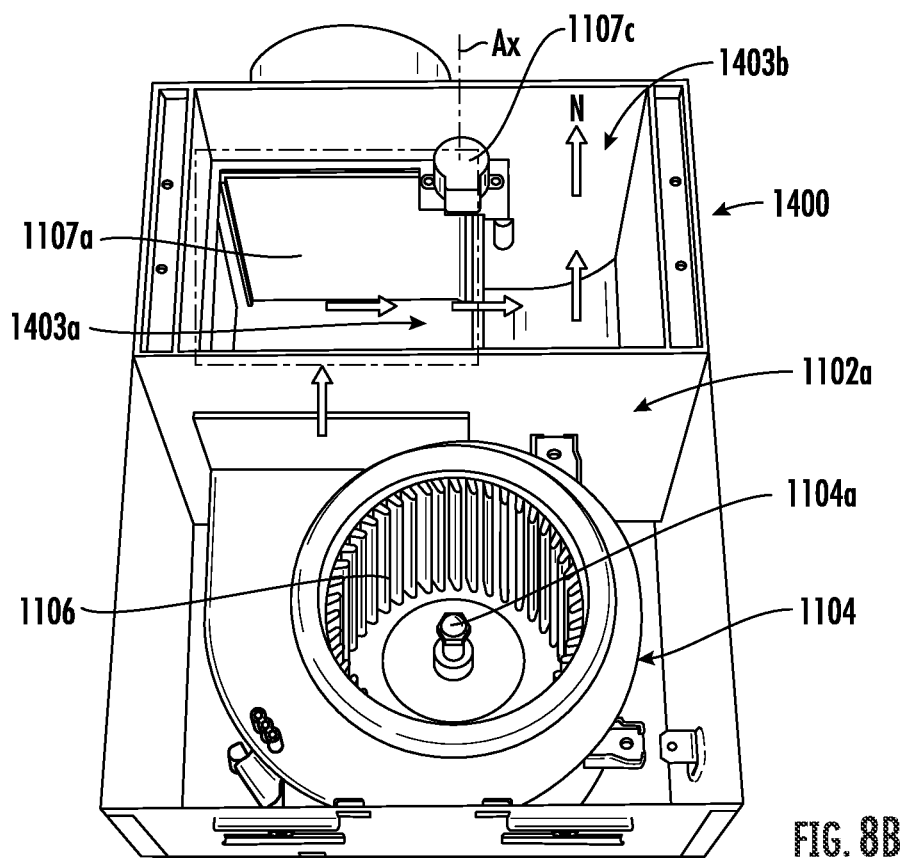

FIGS. 8A and 8B are underside views of a second embodiment of a combined exhaust and filtration assembly 110 which includes a fan assembly 1100 and a filtration assembly 1400. The combined exhaust and filtration assembly 110 also includes a valve gate assembly 1500 for switching between an exhaust mode and a filtration mode. In order to allow an unobstructed underside view of the interior of the assembly 1110, this particular view does not show the inlet panel, or "grill," nor does is show the valve gate cover 1502, each of which will be discussed below in relation to figures in which they are respectively visible.

Figure 8C:
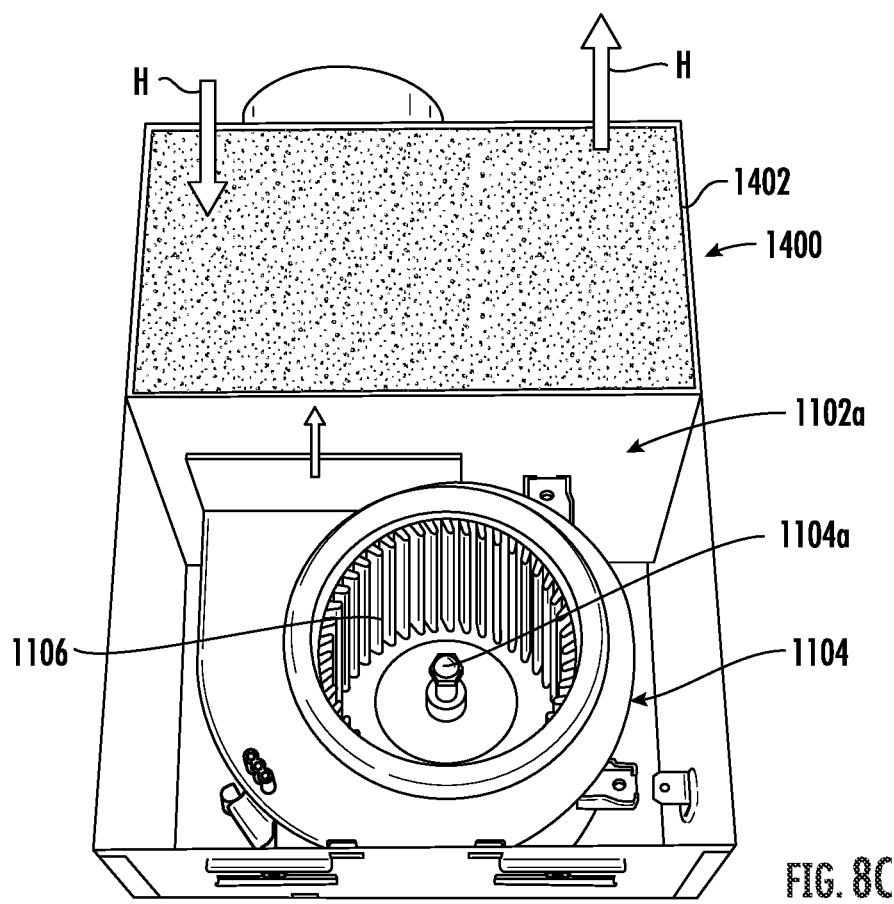

An important difference between the first embodiment and the second embodiment is that instead of selecting which of two motors will be powered to make a path for the output air, as in the first embodiment, in the second embodiment only a single motor is provided, but a valve gate system controls the flow of the fan-driven air to either the exhaust, in a first mode as illustrated in the configuration shown in FIG. 8A, or to the filter, in a second mode as in the configuration shown in FIG. 8B. The same elements are shown in FIGS. 8A and 8B, but the position of a valve gate in the valve gate system differs, as will discussed in detail below. FIG. 8C shows the path of the air to be filtered through the filter 1402, which in this figure is shown schematically to indicate where it lies in the air flow path, in particular using the large arrows H. As will be shown below, the filter will be installed in a grill of the assembly 110, in a manner specified later, but this installation results in the filter being arranged in the relative location illustrated schematically in FIG. 8C.

The assembly 110 includes a housing 1102 having openings at its bottom to define a fan air inlet 1102a, as well as a circular exhaust outlet duct member 1102b sized to connect, e.g., with conventional ductwork. The housing 1102 may, for example, be made of metal, such as steel, and preferably has a generally rectangular body with a circular outlet duct member 1102b.

The combined exhaust and filtration assembly 110 includes, in the second embodiment, a fan assembly 1100 having a motor 1104, a filtration assembly 1400 having a filter, and a valve gate assembly 1500 having a valve gate 1107a attached at an edge thereof to a swivel 1107c having a knob with a direction indicator. The combined exhaust and filtration assembly 110 also includes a PCB board that has logic, such as a microprocessor and associated data storage, such as volatile memory (e.g., RAM) and non-volatile memory, such as EEPROM, e.g., for storing a program to be run by the logic to, for example, control the motor 1104 and the valve gate assembly 1500. The PCB will be discussed in more detail below, and is preferably arranged in the grill, to be illustrated below.

The motor 1104 is disposed at least partially within the housing 1102 and is positioned in a substantially vertical orientation with the motor output shaft 1104a extending as shown in FIGS. 8A and 8B toward the housing inlet 1102a and aligned along an axis of the inlet opening 1102a.

A centrifugal impeller (also referred to herein as a "fan") 1106 is connected directly to the output shaft 1104a of the motor 1104 and is rotated by the motor output shaft 1104a to move air into the inlet 1102a, through the housing interior 1102c and then one of: (a) out of the housing 1102 via the fan air outlet 1102b, and (b) through the filter assembly 1400 and back out into a corresponding room, i.e., a room serviced by the assembly 110.

The centrifugal fan 1106 will preferably pump a constant volume of air (constant CFM) through the fan housing at a constant fan speed and allows for quiet operation (e.g., 2.0 Sones or less). In other embodiments different types of fans, such as axial-flow fans, scroll fans, or cross-flow fans may be used. Impellers and other components could be positioned or located outside of the housing 1102.

The filter assembly 1400 includes a filter inlet 1403a, located in the housing interior 1102c, a filter outlet 1403b and a filter 1402, each visible in other figures. The filter 1402, visible in further figures below, is in a shape of a rectangular solid and fits in the housing in the area indicated by the reference numeral 11.

The filter 1402 includes a filter element 1402a, which would typically be made of a fan-folded bellows filtering material, such as those materials known and used in HEPA type filtration. The filter 1402 is arranged in a slot in the grill attached to the housing so that the filter 1402 can filter air drawn by the motor 1104 in the case in which valve gate 1107a is in a position to block air from exiting through the fan air outlet 1102b, i.e., the valve gate position shown in FIG. 8B.

Two modes of operation are provided in the assembly 110 according to the second embodiment. In the first mode, illustrated in FIG. 8A, the valve gate 1107a is positioned at zero degrees with respect to the direction of air output from the motor 1104. In this position, the air can exit the assembly 110 via the exhaust outlet 1102b, as indicated by the arrows M. The position of the valve gate is controlled by the motor.

In the second mode, illustrated in FIG. 8B, the valve gate 1107a is positioned at 90 degrees with respect to the direction of air output from the motor 1104. In this position, the air is completely blocked from exiting the assembly 110 via the exhaust outlet 1102b, and instead is diverted toward the filter as indicated by the arrows N, and via the path shown by the arrows H in FIG. 8C.

To move between the first and second modes, the valve gate 1107a, which is preferably in the form of a rectangular plate, is attached at one lateral side to a hinge 1103c, which provides for rotation of the gate 1107a at an axis Ax in alignment with the hinge. That is, the valve gate 1107a is fixedly, but rotationally movably coupled to the hinge 1103c in the manner of a door. In switching, for example, between the first mode to the second mode, the door (i.e., valve gate 1107a) is caused to move from a first position, i.e., the position shown in FIG. 8A that closes off the air from reaching the filter, and only allows air to travel toward the exhaust outlet, to a second position, i.e., the position shown in FIG. 8B in which the door blocks the air from travelling toward the exhaust outlet. Preferably the valve gates are moved by a mechanical connection driven by the motor shaft. The selection on the keypad of the appropriate mode determines the movement effected by the motor.

Figure 9:
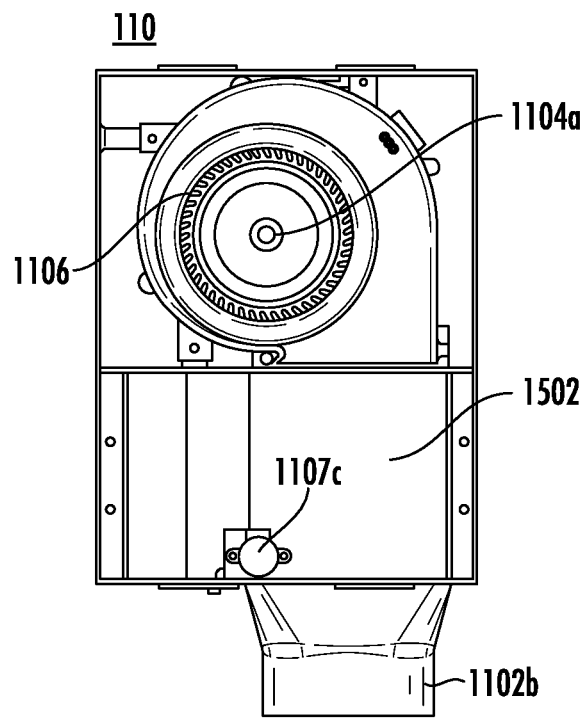
FIG. 9 shows an underside view of the combined exhaust and filtration assembly in the second mode according to the second embodiment.

FIG. 9 shows an underside view of the assembly 110 in the second mode, as can be seen by the positon of the knob of the swivel 1107c. While the knob of the swivel 1107c is visible in FIG. 9, the valve gate 1107a is not visible in the figure because of the illustration in FIG. 9 of the valve gate cover 1502, which blocks the view into the valve gate assembly.

Figure 10A:
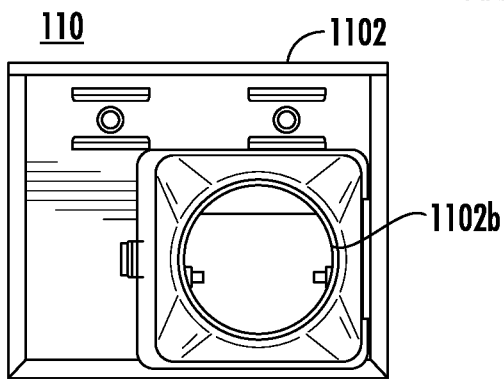
FIGS. 10A and 10B are front and side views, respectively, of the combined exhaust and filtration assembly in accordance with the second embodiment.
Figure 10B:
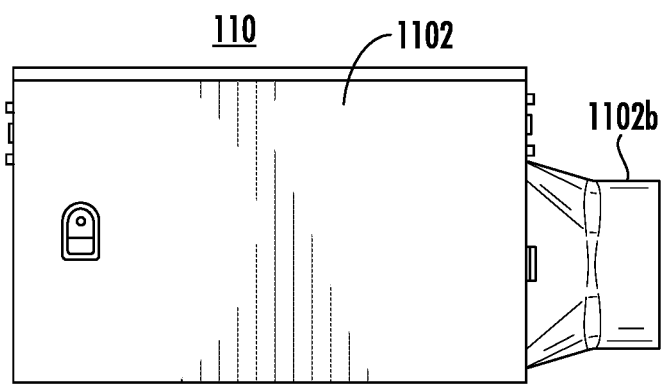

As in the first embodiment, the filter 1402 in the second embodiment includes filter element 1402a, which would typically be made of a fan-folded bellows filtering material, such as those materials known and used in HEPA filtration. The filter 1402 is arranged in the grill so that the filter 1402 can filter air that is drawn by the motor 1104 in the case in which valve gate 1107a is in a position to block air from exiting through the fan air outlet 1102b, i.e., in the second mode in which the valve gate position is shown in FIG. 8B, as well as in FIG. 8C FIGS. 10A and 10B are front and side views, respectively, of the assembly 110 in accordance with the second embodiment, each showing the exhaust outlet 1102b and the housing 1102.

FIGS. 11A, 11B, 11C and 11D are perspective, top, side and elevation views, respectively of the filter 1402. The filter element 1402a can be seen in FIGS. 11A and 11D.

In the second embodiment, a PCB similar to that shown in FIG. 7A and FIG. 7C, using, e.g., a controller 20, is preferably used. In the case of the second embodiment, however the computer is programmed to execute instructions using a different algorithm, in particular an algorithm such as is shown in the flow chart of FIG. 12. That is, FIG. 12 is a flow chart illustrating an exemplary algorithm for controlling the assembly 110 in accordance with the two modes of the second embodiment.

As can be seen in FIG. 12, the flow begins with a start step S200, upon power up or a reset of the device. The flow proceeds to step S202 in which the controller scans for receipt of a mode signal from the remote or the keypad. At step S204 it is determined whether a selection has been made. If no at step S204, then the flow returns to step S202 to continue to monitor for input of a mode selection. If yes at step S204, then the flow proceeds to step S206 at which it is determined whether the exhaust mode has been selected.

If yes at step S206, then at step S208 it is determined whether the valve gate is currently in the filter mode. If yes at step S208, then at step S210 the valve gate is moved from the filter mode to the exhaust mode and then flow goes back to the scanning step S202. If no at step S208, then, at step S212, the valve gate is maintained at the exhaust mode position and the flow returns to the scanning step S202.

If on the other hand, it is determined at step S206 that the exhaust mode is not the mode selected, then, since this means that it was the filter mode that was selected at step S204, it is determined at step S214 if the valve gate is currently in the exhaust mode. If yes at step S214, then the valve gate is moved, at step S216 to the filter mode and the flow returns to the scanning step S202. If no at step S214, then the valve gate is maintained in the filter mode, and the flow goes back to the scanning step S202 and then the flow returns to the scanning step S202.

By virtue of such an algorithm, and the associated gate structure, at any given time air will only pass through the filter, or out through the exhaust path, but never through both. It is noted that in the exemplary flow chart, at step S206 it is arbitrarily assigned that it is first determined whether the exhaust mode is the one selected, and then, if no, the flow proceeds as if the filter mode was selected. This flow achieves the goal of the invention of making sure that only one mode is effected at any given time. However, the skilled artisan would recognize that step S206 could just as easily determine whether the filter mode is the one selected. In such a variant, the steps S214, S216 and S220 would follow from a "yes" answer at step S206, and steps S208, S210 and S212 would follow from a "no" answer at step S206. Since there are only two possibilities, i.e., either the exhaust mode is selected, or the filter mode is selected, either version of the algorithm would work equally well.

Figure 13:
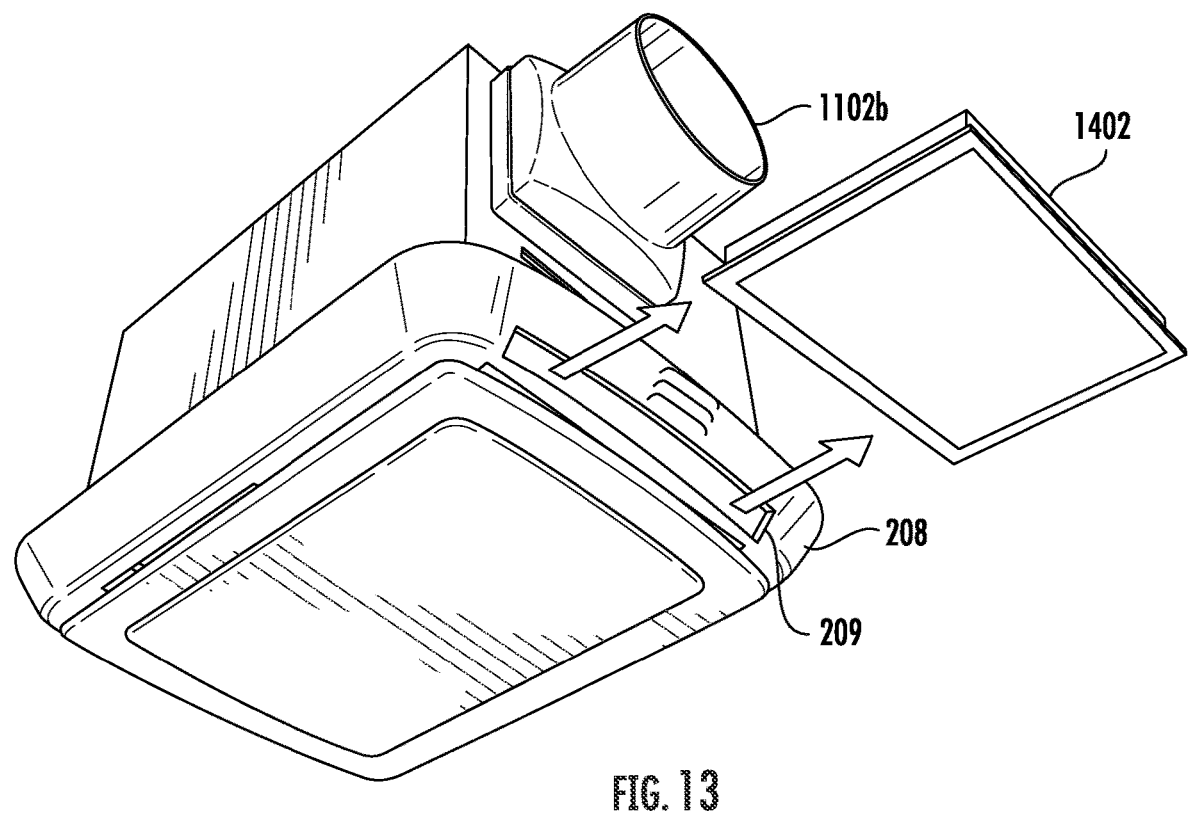
FIGS. 13-15 are views showing a fan grill of the second embodiment.
Figure 14:
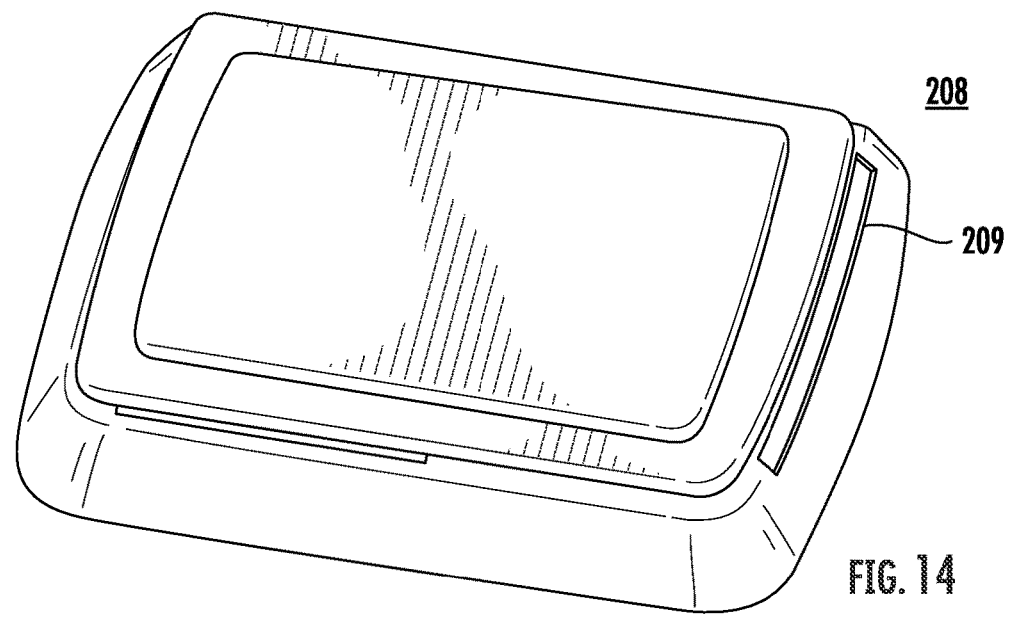
Figure 15:
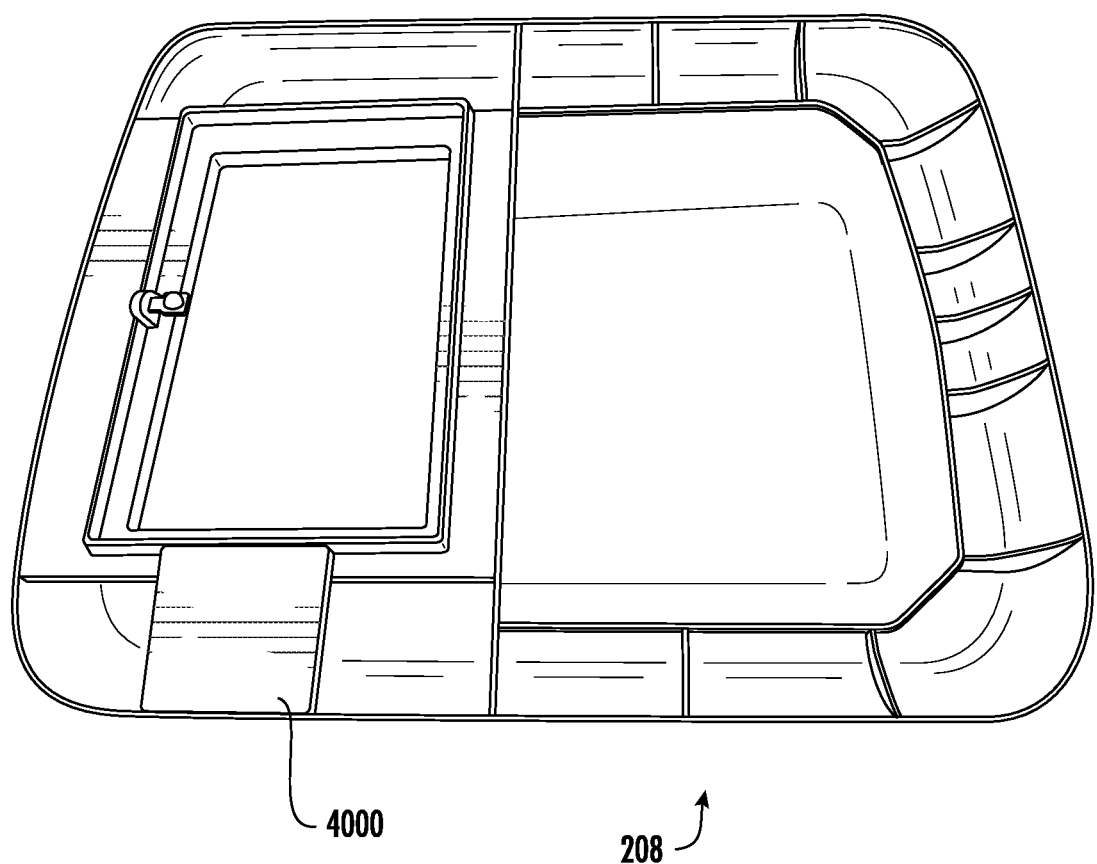

FIGS. 13 to 15 are various views illustrating the grating 208, also referred to as a "grill," in accordance with the second embodiment of the invention.

As discussed above, in the second embodiment, the filter 1402 slidably engages and disengages into a slot 209 in the grating so that, when the grating is attached to the bottom of the assembly 110, the filter itself is situated in the manner shown in FIG. 8C above. FIG. 15 shows the location of the PCB board for the second embodiment, the functions of which have been discussed above.

Figure 16:
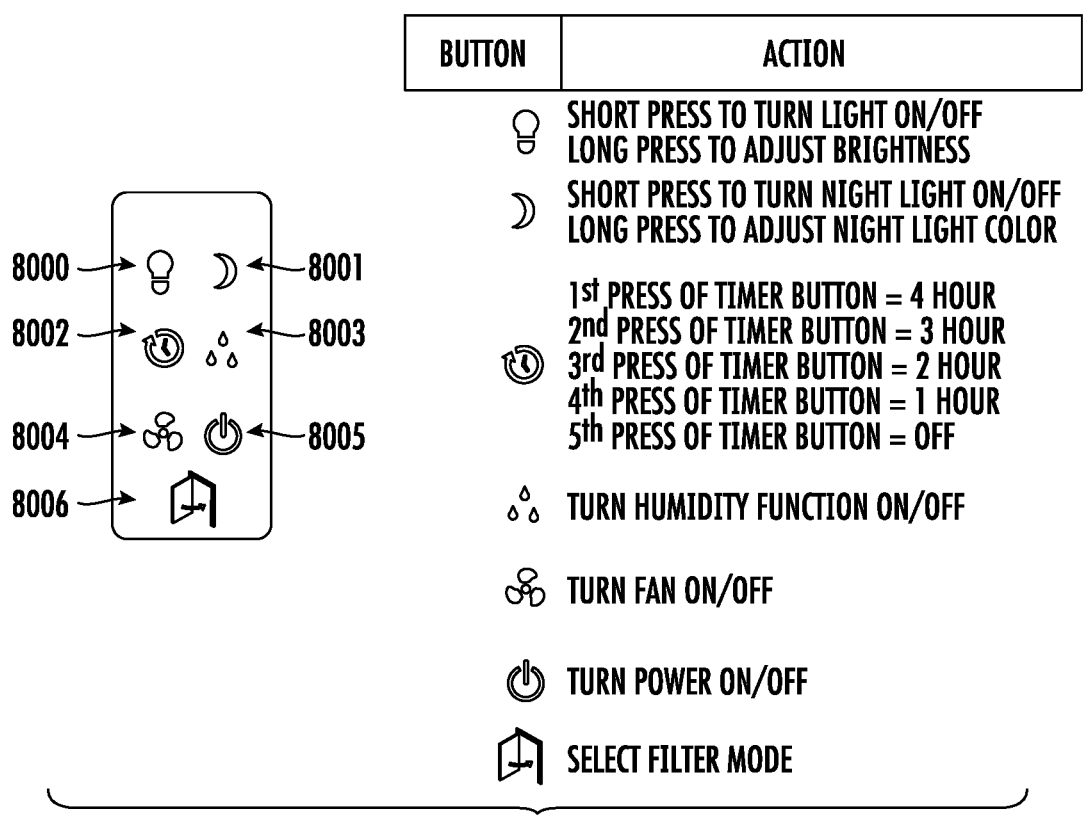
FIG. 16 shows an exemplary user interface touch pad for the second embodiment.

FIG. 16 shows a shows an image of an exemplary touch pad layout for use in the second embodiment together with a key showing the actions by each illustrated button. The light bulb button 8000 is, for example, for adjusting and turning on a light that may optionally be provided on the assembly 10. In the illustrated embodiment, the logic on the PCB is programmed to use a short press of the button to turn ON/OFF the light. A long press likewise will adjust the brightness. The crescent shaped button 8001 will turn on an optional night light with a short press and adjust the night light color with a long press. The curved circling arrows button 8002 is a timer button whose functions are set forth in the key portion of FIG. 16.

The water droplet button 8003 turns on and off an optional humidity/dehumidity function. The fan blades button 4004 provides an ON/OFF function for the fan. The power ON/OFF symbol butter 8005 turns the power on and off for the assembly 110. Finally, the mode switch 8006, shaped like a swiveling door, allows selection between the exhaust and filter modes.

Although the embodiments illustrated herein disclose an assembly having one or two motors, and an exhaust pathway and a filter pathway, it should be understood that in alternate forms the assembly may include other conventional features such as a light and/or a heat lamp.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concepts disclosed herein.

What is claimed is:

1. An exhaust and filtration assembly, comprising:
a housing;
an exhaust vent configured to guide air out of the housing;
an air inlet configured to allow the passage of air into the housing;
an exhaust motor assembly, having an exhaust motor, the exhaust motor assembly being at least partially arranged in the housing and configured to, when powered on, draw air from the air inlet of the housing and direct air out of the exhaust vent;
a filter motor assembly, having a filter motor, the filter motor assembly being at least partially arranged in the housing and configured to, when powered on, draw air from the air inlet of the housing, and direct the air back into the air inlet;
a filter assembly arranged in the housing between the air inlet and the filter motor assembly and configured to filter air; and
a controller comprising computing logic configured to control the powering on and off of the exhaust motor assembly and the filter motor assembly so that only one of the exhaust motor assembly and the filter motor assembly is powered on at any given time.

2. The exhaust and filtration assembly according to claim 1, further comprising a touch sensitive control panel, the control panel being configured to receive tactile input from a user, the input including a selection at least from among an exhaust fan selector and a filter fan selector.

3. The exhaust and filtration assembly according to claim 2, wherein the controller is configured to permit separate running of the assembly in only one of two modes: an exhaust fan only mode, and a filter fan only mode, such that the exhaust fan only mode and the filter fan only mode are mutually exclusive.

4. The exhaust and filtration assembly according to claim 1, wherein the air inlet includes openings in the housing to define a fan air inlet, and the exhaust vent includes a circular exhaust outlet duct member sized and dimensioned to be connectible with housing ductwork.

5. The exhaust and filtration assembly according to claim 4, wherein the housing is made of metal and has, except for the circular outlet duct member, a rectangular shape.

6. The exhaust and filtration assembly according to claim 5, wherein the metal comprises steel.

7. The exhaust and filtration assembly according to claim 1, wherein the filter assembly includes a filter including a filter element made of a filtering material suitable for HEPA filtering.

8. The exhaust and filtration assembly according to claim 7, wherein the filter is arranged in the housing adjacent to the filter motor so that the filter can filter the air that is drawn in from the air inlet by the filter motor.

9. The exhaust and filtration assembly according to claim 1, wherein the exhaust motor is disposed at least partially within the housing and is positioned in a substantially vertical orientation with a motor output shaft extending vertically and aligned along an axis of the air inlet of the housing.

10. An exhaust and filtration assembly comprising:
a housing;
an exhaust vent configured to guide air out of the housing exhaust and filtration assembly;
an air inlet configured to allow the passage of air into the housing;
a valve gate assembly arranged in the housing, the valve gate assembly having a valve gate configured to move selectively between a first position in an exhaust mode in which air can only be directed towards the exhaust vent, and a second position in a filter mode in which air can only be directed towards the air inlet;
a motor and fan assembly at least partially arranged in the housing and configured to, when powered on, draw air from the air inlet of the housing and to drive air toward the valve gate assembly;
a filter assembly arranged in or adjacent to the housing between the valve gate assembly and the air inlet and configured to filter air and guide the filtered air out of the air inlet; and
a controller comprising computing logic configured to control the position of the valve gate between the first position in the exhaust mode and the second position in the filter mode, wherein the control of the valve gate position is on the basis of a mode selection of a user.

11. The exhaust and filtration assembly according to claim 10, further comprising a touch sensitive control panel, the control panel being configured to receive tactile input from a user, the input including a selection at least from among the exhaust mode and the filter mode.

12. The exhaust and filtration assembly according to claim 11, wherein the controller is configured to permit separate running of the assembly in only one of the exhaust mode and the filter mode, by controlling of the position of the valve gate between the first position in the exhaust mode and the second position in the filter mode based on the selection made by the user on the touch sensitive control panel.

13. The exhaust and filtration assembly according to claim 12, wherein,
- in the first position in the exhaust mode, the valve gate is positioned at zero degrees with respect to the direction of air output from the motor, such that air can exit the a exhaust and filtration assembly via the exhaust outlet, and
- in the second position in the filter mode, the valve gate is positioned at 90 degrees with respect to the direction of air output from the motor, such that air is completely blocked from exiting the assembly via the exhaust outlet, and instead is diverted toward the filter.

14. The exhaust and filtration assembly according to claim 10, wherein the filter assembly includes a filter including a filter element made of a filtering material suitable for HEPA filtering.

15. The exhaust and filtration assembly according to claim 14, wherein the filter is arranged in a slot in a grating arranged adjacent the housing so that the filter can filter air that is moved through the filter by the motor when the valve gate is in the second position in the filter mode.

16. The exhaust and filtration assembly according to claim 1, wherein the exhaust and filtration assembly is servicing a room, the exhaust motor assembly and the filter motor assembly draw air from the room through the air inlet and the filter motor assembly directs air to the room through the air inlet.

* * * * *